Figure 6:
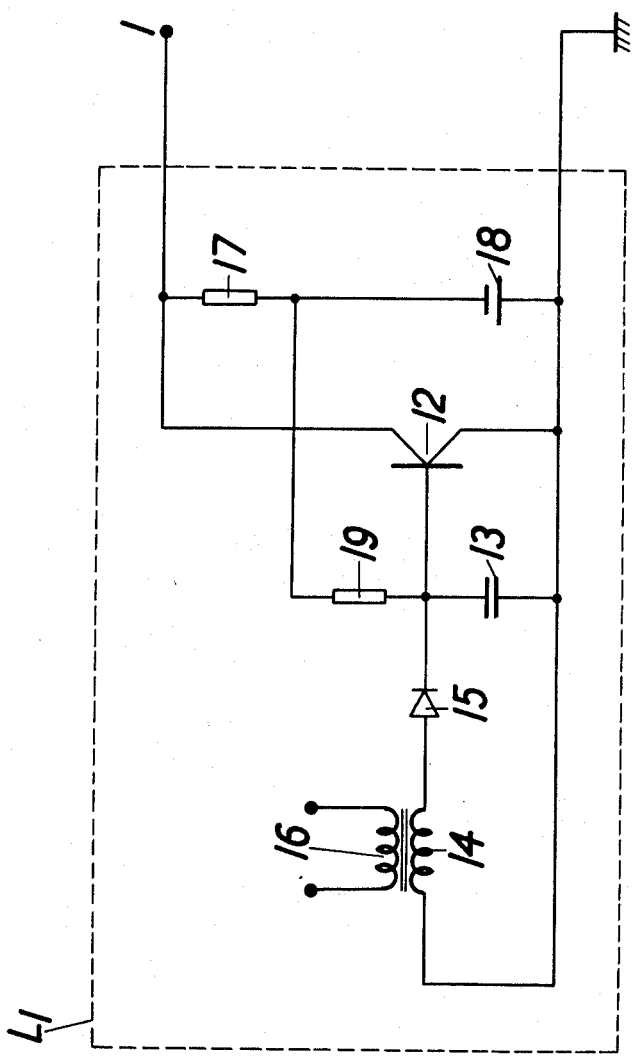

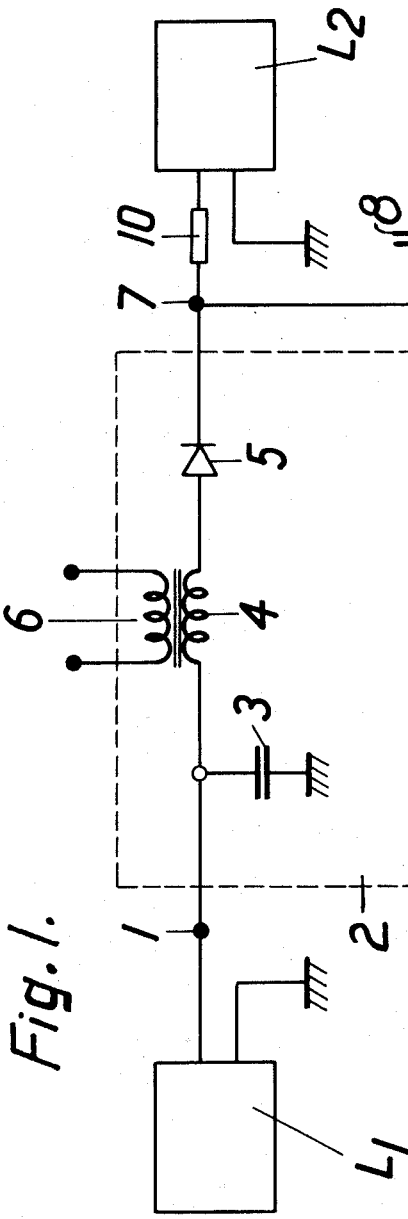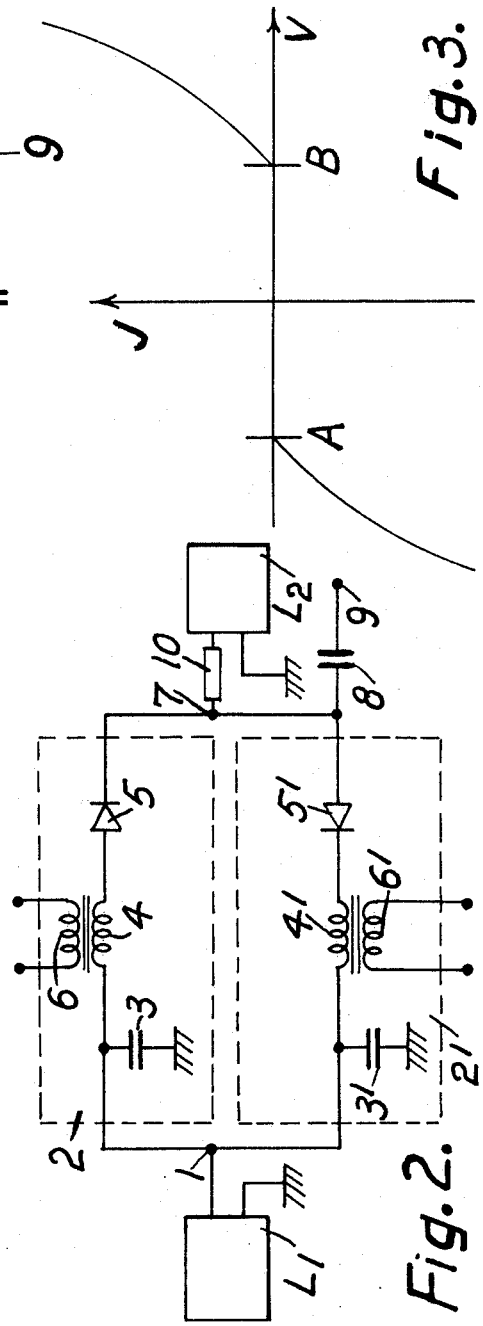
INVENTORS
BÖRJE INGVAR LARSSON
ARNE WORMBS
By Hane and Nydick
ATTORNEYS

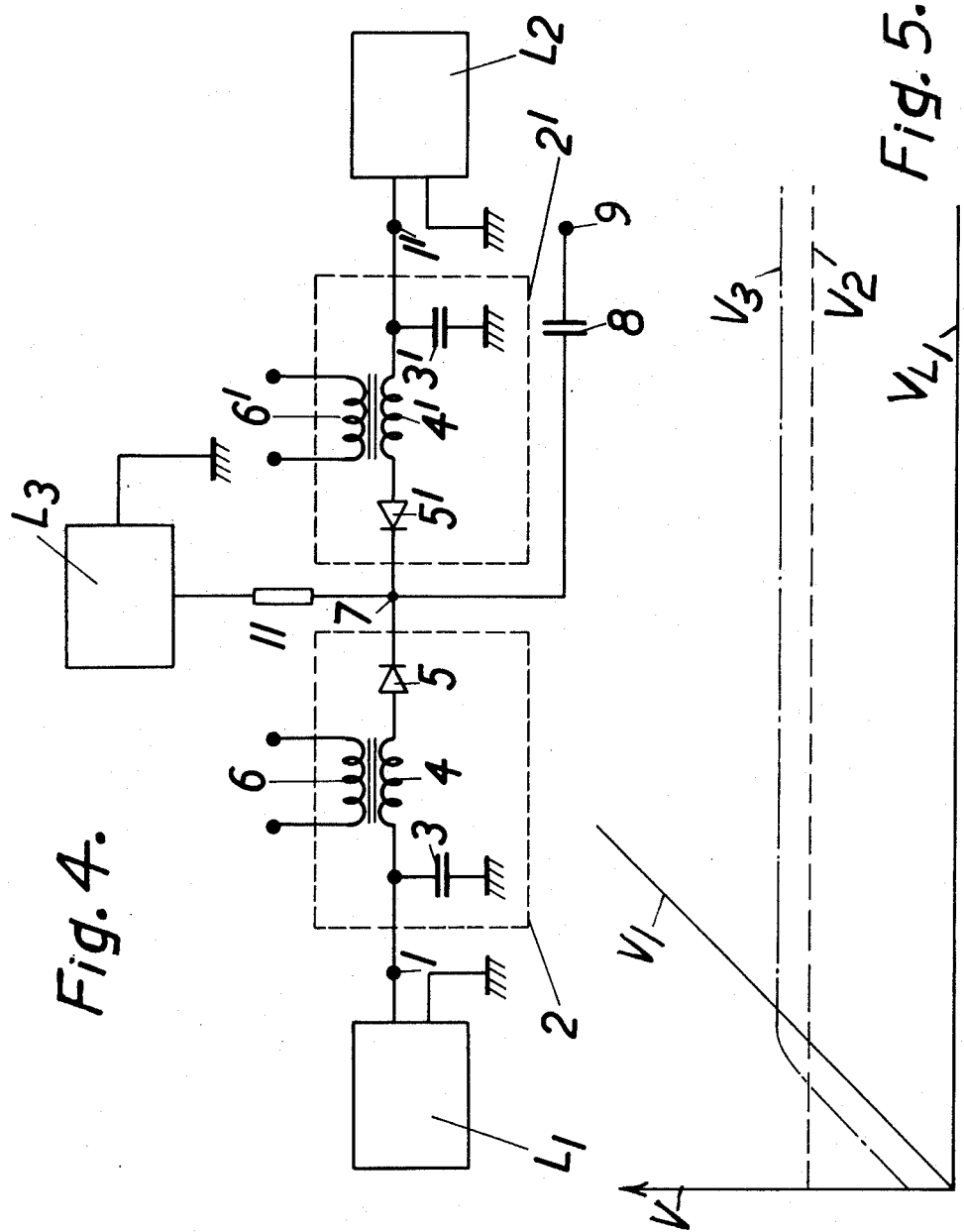

Nov. 28, 1961  B. I. LARSSON ET AL  3,011,077
ELECTRICAL SYSTEM WITH STATIC LOAD SWITCHING
Filed March 6, 1958  4 Sheets-Sheet 3

INVENTORS
BÖRJE INGVAR LARSSON
ARNE WORMBS

By Hamre and Nydick
ATTORNEYS

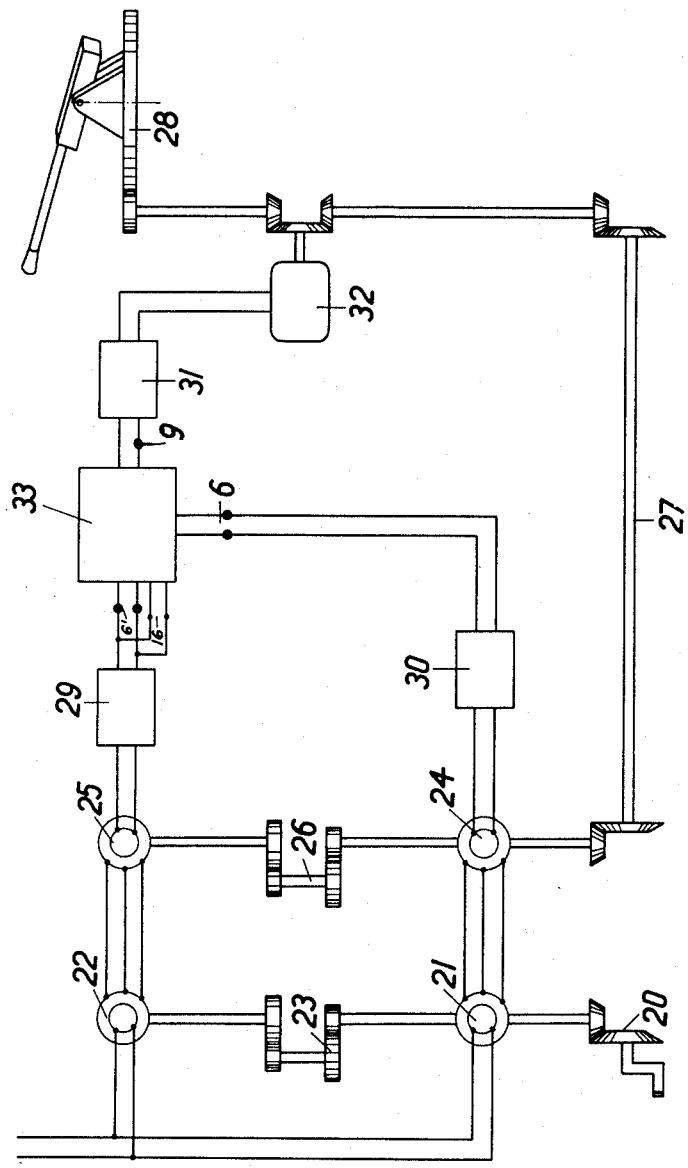

United States Patent Office
3,011,077
Patented Nov. 28, 1961

3,011,077
ELECTRICAL SYSTEM WITH STATIC LOAD SWITCHING
Börje Ingvar Larsson, Bromma, and Arne Wormbs, Stockholm, Sweden, assignors to Aktiebolaget Bofors, Bofors, Sweden, a corporation of Sweden
Filed Mar. 6, 1958, Ser. No. 719,560
Claims priority, application Sweden Mar. 8, 1957
3 Claims. (Cl. 307—127)

The present invention relates to a switching device for connecting or disconnecting an A.C. voltage to a consumer operated by such voltage.

There are known switching devices for that purpose which are electronically controlled. Switching devices of this kind operate satisfactorily as to their switching performance, but the useful life of the devices is limited to the lifetime of the tube or tubes first to fail. They are also inherently fragile, due to the use of tubes. Such inherent fragility is particularly undesirable when the switching devices are used as components of installations in which they are bound to be exposed to severe jolts and other severe mechanical stresses, for instance, in connection with installations used for the training of guns. Obviously physical damage to the tubes or other fragile components of the electronic equipment will render the entire switching device inoperative. Furthermore, electronic switching devices require more space than desirable and often readily available.

Purely mechanical switching devices have also been developed and tried, but have been found less satisfactory for several reasons, especially as to the switching performance.

Accordingly, it is an object of the invention to provide a novel and improved switching device of the general kind above referred to, which is reliable in operation, rugged in construction and the space requirements of which are smaller than heretofore practical.

Another object of the invention is to provide a novel and improved switching device which is purely electrical in nature, but does not include fragile electronic components such as electron tubes.

Still another object of the invention is to provide a novel and improved switching device which controls the desired switching operations by controlling the passage of the A.C. voltages to be connected or disconnected by discriminating between controlled variations of D.C. control voltages.

The aforementioned and other objects, features and advantages which will be pointed out hereinafter and are set forth in the appended claims which constitute part of the application, are attained by providing network means having a series branch and a parallel branch. The series branch comprises the secondary winding of a transformer, the primary winding of which constitutes the input or output for the A.C. voltage to be connected or disconnected, and a circuit component having a non-linear performance characteristic, such as a rectifier having a predetermined disruptive or blocking voltage exceeding the amplitude of the A.C. voltage to be connected or disconnected. The parallel branch comprises a capacitance means or an impedance means having similar performance characteristics and is connected at one end to one end of the series branch. This one end of the series branch and the other end of the parallel branch constitute the input side of the network and the other end of the series branch and said other end of the parallel branch constitute the output side of the network. The respective transformer winding and the non-linear circuit component are thus located between the output side of the network and the parallel branch. The input side and the output side of the network are each connected to a D.C. source one of which has a fixed voltage and the other a variable voltage. Depending upon the adjusted value of the variable voltage the non-linear circuit component will then pass or block the A.C. voltage to be connected and disconnected respectively. The output and input respectively of the switching device consists of the output of the network.

A further object of the invention is to provide a novel and improved switching device which functions as a change-over switch. According to the invention such change-over switching action is attained by feeding to the switching device two A.C. voltages different from each other and providing means which pass only one of said voltages. Such change-over switching device affords the advantage over change-over switching devices employing electron tubes that in the event a small fraction of the undesired voltage is passed, such undesired voltage fraction will not be amplified as it is in heretofore known change-over switching devices employing electron tubes.

In the accompanying drawing several preferred embodiments of the invention are shown by way of illustration and not by way of limitation.

In the drawing:
FIG. 1 is a typical circuit diagram of a switching device according to the invention.
FIG. 2 is a switching device functioning as a change-over switch.
FIG. 3 is a graph showing the function of the switching device according to FIG. 2.
FIG. 4 is a modification of the switching device according to FIG. 2.
FIG. 5 is a graph showing the function of the switching device according to FIG. 4.
FIG. 6 is a circuit diagram of one of the D.C. sources utilized in the switching device of FIG. 4, and
FIG. 7 is a diagram showing a switching device according to the invention as part of a servo system.

Referring first to FIG. 1 in detail, the switching device according to this figure comprises a suitable D.C. source $L_1$, the output voltage of which is variable by appropriate regulating means well known for the purpose. One of the output terminals of the D.C. source is connected to ground and the other terminal designated 1 is connected to a network system 2. The network system comprises a parallel branch including a capacitor 3, and a series branch including the secondary winding 4 of a transformer and a non-linear circuit component 5 connected in series with winding 4. The parallel branch is grounded at one end and the other end is connected to the input side of the network. The non-linear component 5 is shown as a rectifier, the disruptive or blocking voltage of which is such that it is in excess of the amplitude of the A.C. voltage to be controlled. The output terminal 7 of the network is connected through a capacitor 8 to an output terminal 9 and is also connected through a resistance means 10 to one terminal of a second A.C. source $L_2$ which has a fixed voltage. The other terminal of voltage source $L_2$ is grounded. The terminal 9 should be visualized as an input terminal of a consumer.

The A.C. voltage to be connected or disconnected is supplied to the primary winding 6 of the transformer and can be taken out between terminal 9 and ground, or is blocked, depending upon the setting of the switching device, or more specifically, upon the differential between the voltages of the sources $L_1$ and $L_2$. As is apparent, the transformer winding 4 which receives an A.C. voltage through winding 6 is connected to ground through capacitor 3 which blocks the passage of the direct current, as does capacitor 8.

Let it be first assumed that the D.C. sources $L_1$ and $L_2$ were not present. Then no A.C. voltage can be taken out at terminal 9, due to the action of rectifier 5, the blocking voltage of which is higher than the amplitude of the A.C. voltage, as already mentioned. Assuming now that the D.C. voltage sources are present, then the rectifier will block the flow of the A.C. voltage to terminal 9 only when and as long as voltage source $L_1$ has a lower voltage output than voltage source $L_2$. However, if the voltage of source $L_1$ is increased in relation to the voltage of source $L_2$ to an extent such that the voltage differential between the two D.C. voltages exceeds the blocking voltage of rectifier 5, current will flow from voltage source $L_1$ to voltage source $L_2$. In other words, the network system 2 is no longer blocking so that the voltage supplied to winding 6 can be taken out at terminal 9.

It is now apparent that the switching device will pass A.C. voltage applied to winding 6 to terminal 9 only when the voltage of source $L_1$ is raised to a value higher than the voltage of voltage source $L_2$. It is further apparent that the switching device will not pass the flow of A.C. voltage from winding 6 to terminal 9 when the voltage of source $L_1$ in relation to the voltage of source $L_2$ is such that the voltage across rectifier 5 is of a value such that the rectifier causes blocking. In other words, the connection of a source of A.C. voltage to a consumer connected to terminal 9 by means of the switching device can be controlled by appropriately regulating the voltage of voltage source $L_1$.

The switching system according to FIG. 2 shows two network systems of the kind shown in FIG. 1 connected in parallel, except that the rectifiers in the series branch of the network systems are connected in opposition. The components of one network system are designated by the same numerals as in FIG. 1 and the corresponding components of the second network system are designated by the same reference numerals but primed.

Two alternating voltages different from each other are applied to transformer winding 6 and 6' respectively. These voltages can be taken out alternately at the common terminal 9, depending upon the pass direction of the rectifiers. The graph of FIG. 3 shows the performance characteristics of the two rectifiers. The coordinate of the diagram is calibrated in current values and the abcissa in voltage values. The graph shows that the switching device according to FIG. 2 has a blocking action within the voltage range defined by points A and B. If the voltage output of voltage source $L_1$ has a value such that the voltage across rectifiers 5 and 5' has a value outside the range A—B an alternating voltage can always be taken out at terminal 9. This voltage may be supplied from either winding 6 or winding 6' depending upon the voltage output of voltage source $L_1$.

FIG. 4 shows a modification of the switching device according to FIG. 2 in that the two network systems of this figure are connected in series and that a third A.C. voltage source $L_3$ is connected with one terminal through a resistance means 11 to the common connection point 7 between the two networks. The second terminal of source $L_3$ which has a fixed voltage, is grounded.

The function of the device according to FIG. 4 differs from that of FIG. 2 in that the switching operation occurs directly or continuously, that is, without the intermittent or dead voltage zone which is inherent in the arrangement of FIG. 2 and clearly shown in the graph of FIG. 3.

The function of the switching device according to FIG. 4 will be more readily comprehended from an examination of the graph according to FIG. 5. In this figure the voltage $V_{L_1}$ of voltage source $L_1$ is entered on the abcissa and the voltage at points 1, 1' and 7 of the switching device is plotted on the coordinate. The voltage of source $L_1$ is such that the voltage $V_1$ in point 1 is directly proportional to the voltage of the voltage source $L_1$. This relation is shown in the graph by a straight line $V_1$. The fixed voltage $V_2$ of the voltage source $L_2$ which voltage prevails at point 1' in relation to the voltage $V_{L_1}$ is shown as a straight line marked $V_2$ parallel to the abcissa. In order to provide conditions at which the network system 2 is capable of passing current, the voltage $V_1$ of point 1 must have a voltage in excess of the voltage $V_3$ of point 7 to an extent such that the voltage differential is greater than the blocking voltage of rectifier 5. The network system 2' will pass D.C. voltage when the voltage differential between the voltages $V_3$ and $V_2$ is of the same magnitude as required for network system 2. If a graph line is drawn of the voltage required at point 7 so that either of the network systems passes A.C. current for different values of $V_{L_1}$ it will be found that such graph line is represented by the graph line marked $V_3$. As is evident from the graph lines of FIG. 5, switching will take place directly or continuously, that is, without any dead zone with the switching device according to FIG. 4.

While within the scope of the invention, various kinds of voltage sources $L_1$ having a variable D.C. voltage output can be utilized, a suitable transistor circuit such as shown in FIG. 6 has been found particularly advantageous. According to FIG. 6, the cathode and the grid of a transistor 12 are connected to a network comprising as series branch the secondary winding 14 of a transformer and a rectifier 15. The transformer winding and the rectifier are connected in series and one end of the series branch is connected to one end of the parallel branch including a capacitor 13. The other end of the parallel branch is grounded. The primary transformer winding 16 should be visualized as being fed with a pilot signal. A resistance means 17 and a D.C. voltage source 18 connected in series with each other are connected between the anode and the cathode of the transistor. The connection point between resistance means 17 and voltage source 18 is connected to the grid of the transistor through a resistance means 19. Finally the anode of the transistor is connected to the input terminal 1 of one of the switching devices as previously pointed out and the cathode of the transistor is grounded.

The D.C. voltage source just described delivers a variable D.C. voltage to terminal 1 depending upon the magnitude of the pilot voltage fed to winding 16. The pilot voltage is preferably an A.C. voltage which has a fixed frequency. The rectified pilot voltage charges capacitor 13, the voltage of which controls the transistor 12 so that the output voltage of the voltage source $L_1$ depends upon the voltage across capacitor 13. The output voltage may be conveniently varied by varying the amplitude of the pilot voltage.

FIG. 7 shows the use of one of the switching devices as previously described in conjunction with or as part of a servo system. The switching device used in the installation of FIG. 7 should be visualized as being a switching device according to FIG. 2 or 4. The servo system should be visualized as a conventional system of the kind including a coarse system and a fine system. The installation includes a transmitter 21 associated with the fine system and a transmitter 22 associated with the coarse system. The two transmitters can be controlled by any suitable means diagrammatically shown as an actuating means 20. The transmitters are directly coupled by a suitable transmission means 23 diagrammatically shown as a gear train which maintains a pre-determined ratio of transmission between transmitters 21 and 22 when actuating means 20 is operated. The two transmitters should be visualized as including synchronizing or follow-up devices having a stator and a rotor. The rotor windings are fed with an A.C. voltage from a power main having for instance 120 volts and 400 cycles per second. The stator windings of the two transmitters are connected to the stator windings of two similar control transformers 24 and 25 which are also coupled to each other through a transmission means 26 diagrammatically shown as a gear train of a suitably selected ratio of transmission. The control transmitter 24 is connected through a mechanical transmission means 27 shown as a linkage and bevel gear system to the object 28 to be controlled, illustrated in FIG. 7 as the traversing mechanism of a gun emplacement, or more specifically, the traversing of the gun is to be controlled by operating the handle of the actuating means 20. The rotor windings of transmitter 25 are connected to the input side of an amplifier 29. The output side of this amplifier is connected to a switching device 33 which may be either of the type shown in FIG. 2 or in FIG. 4, and more specifically to the transformer winding 6' of the respective device. The output side of the amplifier is further connected to the D.C. voltage source $L_1$ of the switching device in order to control the value of the voltage output of this source.

The D.C. voltage source $L_1$ according to FIG. 6 may also be used in the installation of FIG. 7, in which event the output side of the amplifier is connected to the transformer winding 16 (see FIG. 6), as is indicated in FIG. 7.

The rotor windings of the control transmitter 24 are connected to the input side of an amplifier 30, the output of which is connected to the transformer winding 6 of a switching device as shown in FIG. 2 or 4.

The second voltage source $L_2$ used in the switching device may be any source of D.C. voltage provided only that it is capable of supplying a constant D.C. voltage. Hence the source $L_2$ may be a storage battery or any part of the servo system that is at a constant D.C. voltage.

The output terminal 9 of the switching device 33 is connected to a unit 31 which should be visualized as comprising a detector, a filter network and a D.C. amplifier. Units of this kind are well known to the experts in the art. The detector is a so-called phase detector which supplies to a drive means 32 for the traversing mechanism of the gun 28 such a D.C. signal that the gun will move in the desired direction and not at the opposite one. The filter network has the aim of stabilizing the servo system. As the signal from the unit 33 is not strong enough, it is amplified in the D.C. amplifier.

The switching device according to the invention functions in the installation of FIG. 7 as a change-over switch, discriminating between the coarse and the fine systems of the servo system. The functioning of the switching device proper has been previously described in detail and the operation of the servo system is well understood in the art so that a more detailed description of the operation of the servo system in conjunction with the switching device appears to be not essential for the understanding of the invention.

While the invention has been described in detail with respect to certain now preferred examples and embodiments of the invention it will be understood by those skilled in the art after understanding the invention, that various changes and modifications may be made without departing from the spirit and scope of the invention, and it is intended, therefore, to cover all such changes and modifications in the appended claims.

What is claimed as new and desired to be secured by Letters Patent is:

1. A switching device for connecting and disconnecting respectively A.C. voltages to a load terminal, said device comprising two networks connected in series, each network having a series branch and a parallel branch including one winding of a transformer and a circuit component having a non-linear performance characteristic, the other winding of each transformer being connectable to one of the A.C. voltages to be connected and disconnected respectively, each parallel branch including capacitance means and being connected on one end to one end of the respective series branch, said end of the respective series branch and the other end of the respective parallel branch constituting the input side of the respective network, the other end of the series branches being connected to constitute the common output side of the two networks, the non-linear circuit components in said networks being connected in opposition, a source of D.C. voltage connected to the input side of each network, one of said voltage sources having a fixed voltage and the other a variable voltage, and a third D.C. voltage source having a fixed voltage, said third voltage source being connected to the connection point between the two networks, said connection point constituting the output side of the switching device, whereby said non-linear circuit component in each network passes and blocks respectively the respective A.C. voltage in response to the set value of the variable D.C. voltage and the pass direction of the respective non-linear circuit component.

2. A switching device according to claim 1 wherein each of said non-linear circuit components comprises a rectifier means having a blocking voltage in excess of the amplitude of the respective A.C. voltage to be connected and disconnected.

3. A switching device according to claim 1 wherein said variable D.C. voltage source comprises a transistor circuit means, the output of said transistor circuit means being connected to the input side of the network, the transistor circuit including means for feeding a variable pilot signal to the circuit means, said pilot signal controlling the output voltage of the transistor circuit means.

References Cited in the file of this patent

UNITED STATES PATENTS

| | | |
|---|---|---|
| 2,455,364 | Hays | Dec. 7, 1948 |
| 2,511,863 | McCoy | June 20, 1950 |
| 2,560,337 | Fouassin | July 10, 1951 |
| 2,576,026 | Meacham | Nov. 20, 1951 |
| 2,657,318 | Rack | Oct. 27, 1953 |

OTHER REFERENCES

Engineering Electronics, Happel and Hesselberth, McGraw-Hill, New York, 1953, page 469, FIG. 16-9.